(12) United States Patent
Maille et al.

(10) Patent No.: US 7,676,923 B2
(45) Date of Patent: Mar. 16, 2010

(54) METHOD AND APPARATUS FOR MANUFACTURING A HELICOPTER ROTOR FAIRING, AND A FAIRING OBTAINED THEREBY

(75) Inventors: Laurence Maille, Belcodene (FR); Luc Mouton, Eguilles (FR)

(73) Assignee: Eurocopter, Marignane (FR)

( * ) Notice: Subject to any disclaimer, the term of this patent is extended or adjusted under 35 U.S.C. 154(b) by 1129 days.

(21) Appl. No.: 11/295,523

(22) Filed: Dec. 7, 2005

(65) Prior Publication Data
US 2006/0169835 A1 Aug. 3, 2006

(30) Foreign Application Priority Data
Dec. 16, 2004 (FR) .................................. 04 13397

(51) Int. Cl.
*B21K 25/00* (2006.01)
(52) U.S. Cl. .................. 29/889.2; 29/889.21; 264/249; 264/259
(58) Field of Classification Search ................ 29/889.2, 29/889.21, 23.51, 889.7; 244/17.19; 264/248, 264/249, 259, 261, 263, 294
See application file for complete search history.

(56) References Cited
U.S. PATENT DOCUMENTS

| 4,594,761 | A | * | 6/1986 | Murphy et al. ........... 29/889.71 |
| 4,639,284 | A | * | 1/1987 | Mouille et al. .............. 156/213 |
| 5,158,733 | A | | 10/1992 | Trimble |
| 5,251,847 | A | | 10/1993 | Guimbal |
| 5,462,408 | A | * | 10/1995 | Coffy ..................... 416/134 A |
| 5,498,129 | A | | 3/1996 | Dequin et al. |
| 6,035,531 | A | * | 3/2000 | Besse et al. ................ 29/889.6 |
| 6,056,838 | A | * | 5/2000 | Besse et al. .................... 156/75 |
| 6,613,258 | B1 | * | 9/2003 | Maison et al. .............. 264/102 |
| 2002/0081346 | A1 | | 6/2002 | Ekendahl et al. |
| 2004/0079838 | A1 | | 4/2004 | Simpson et al. |
| 2004/0219251 | A1 | * | 11/2004 | Eberth et al. ................ 425/520 |

FOREIGN PATENT DOCUMENTS

| EP | 1 308 265 | 5/2003 |
| FR | 2 556 650 | 6/1985 |
| WO | WO 9609159 | 3/1996 |

OTHER PUBLICATIONS

"Helicopter Yaw Control", Aircraft Engineering, Bunhill Publications Ltd. London, GB, vol. 62, No. 5, May 1, 1990, pp. 23-25.

* cited by examiner

*Primary Examiner*—David P Bryant
*Assistant Examiner*—Ryan J Walters
(74) *Attorney, Agent, or Firm*—Young & Thompson

(57) ABSTRACT

The invention relates to a method of manufacturing a tail structure for a rotary wing aircraft, the structure comprising:
  a tubular portion or duct (63) presenting two ends and including two collars or flanges (66, 70) extending respectively from each of said two ends; and
  two curved fairing side walls (45, 47) extending respectively around the two collars or flanges; said two side walls being made of a composite material comprising an organic matrix and reinforcement; in a method of the invention, the side walls are united by solidifying the matrix.

21 Claims, 6 Drawing Sheets

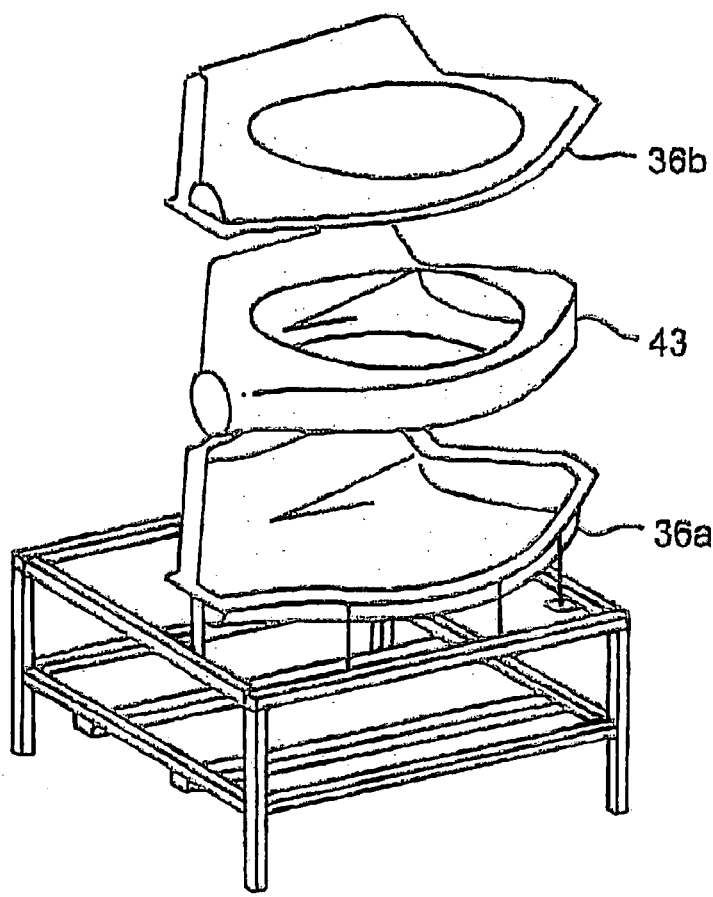
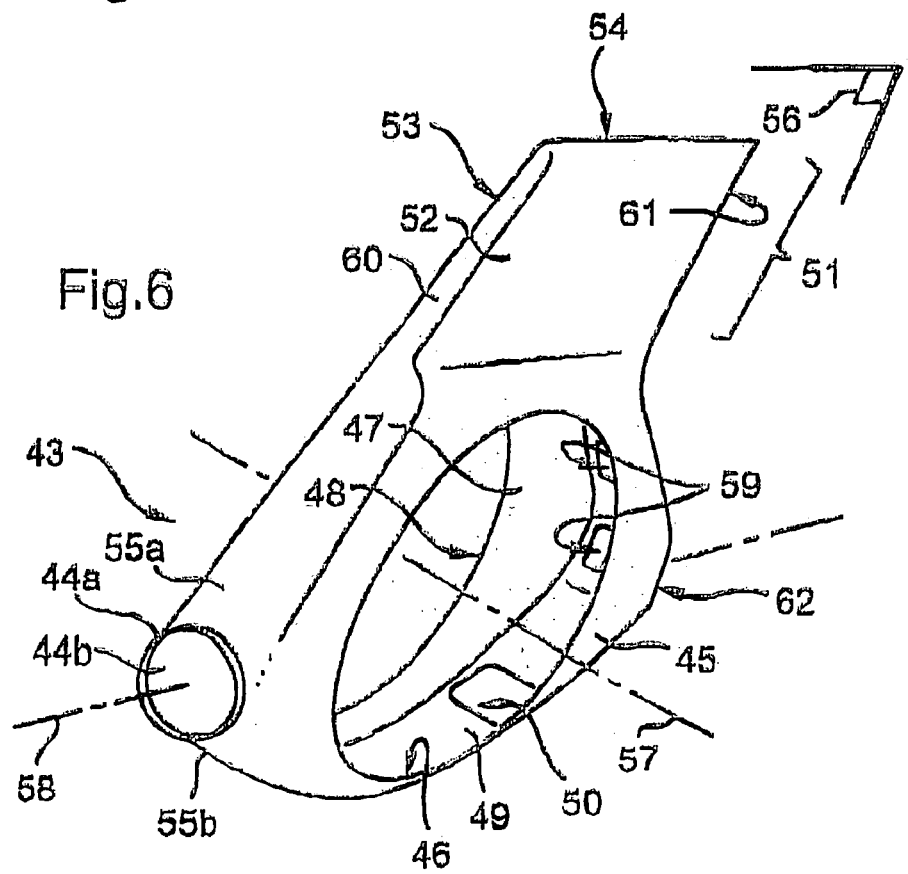

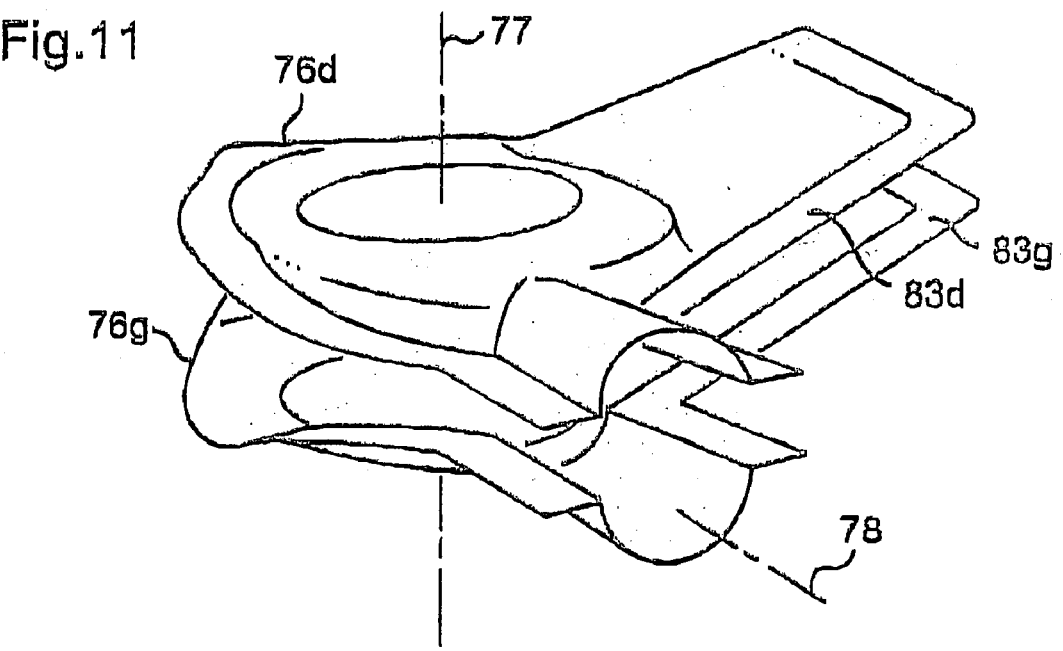
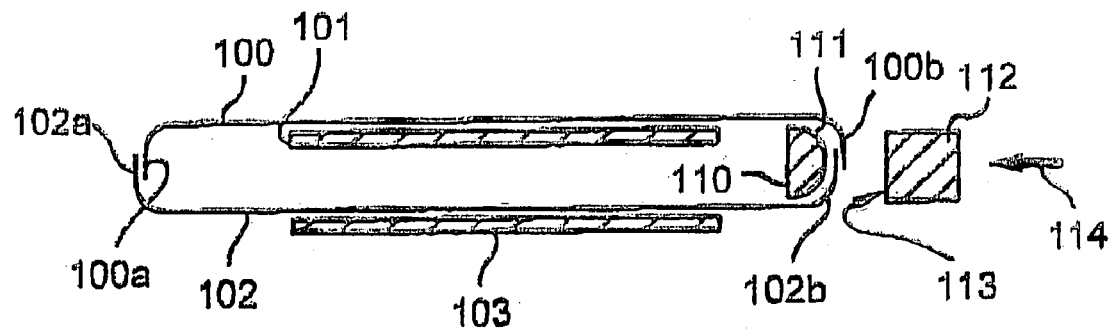
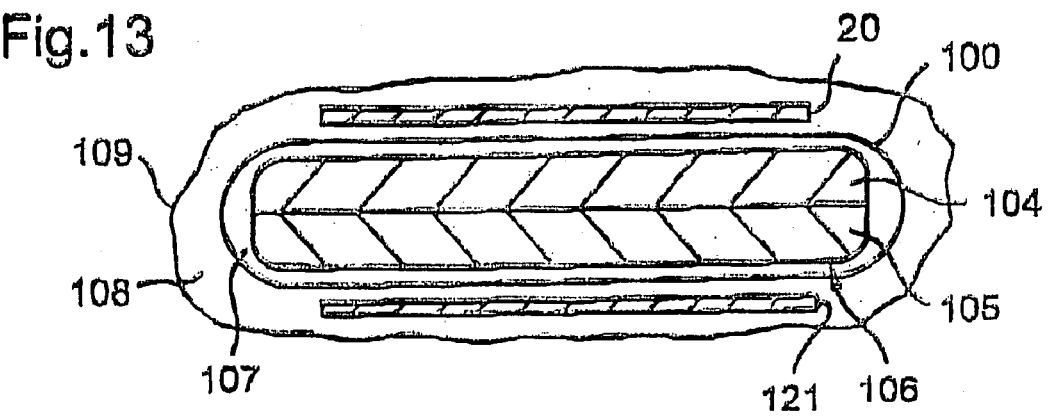

METHOD AND APPARATUS FOR MANUFACTURING A HELICOPTER ROTOR FAIRING, AND A FAIRING OBTAINED THEREBY

FIELD OF THE INVENTION

The present invention relates to a method of manufacturing a fairing structure for an anti-torque rotor of a rotary wing aircraft—in particular a helicopter—, to apparatus or tooling for implementing the method, and also to structures obtained by the method.

The technical field of the invention is that of manufacturing helicopters.

The invention relates more particularly to manufacturing a helicopter tail structure that includes a faired anti-torque rotor.

BACKGROUND OF THE INVENTION

Patents U.S. Pat. No. 5,498,129 and FR 2 719 553 describe such a structure that is secured to the rear end of a tail boom extending the fuselage and that receives a rotor for opposing the torque exerted on the fuselage by the main rotor for providing the aircraft with lift and propulsion.

That structure comprises an annular (or tubular) wall forming a duct defining a flow tunnel for the stream of air driven by the anti-torque rotor which is housed in the duct.

In general, such a duct presents in succession, from upstream to downstream: a converging inlet portion; a cylindrical portion (constant radius); and a diverging portion that terminates by a tunnel outlet having a rounded edge; each end of the duct includes an annular flange or collar.

The tail structure also includes two side flanks (a left flank and a right flank) or fairing side walls, each having an orifice and secured via the edge of said orifice to a respective one of the two flanges of the tubular duct.

The tail structure further includes a substantially vertical fin or stabilizer secured to the side walls of the fairing and extending above them, substantially along a fore-and-aft vertical plane of general symmetry of the aircraft fuselage, or else inclined at an angle relative to said plane.

Such a tail structure is generally obtained by assembling at least four main parts, to which there need to be added reinforcing parts extending between the side walls of the fairing that they unite, and also at least one connection part for securing said tail structure to the tail boom.

Those various parts are generally made of a composite material comprising an organic matrix and reinforcing fibers; a portion of the fairing side walls and of the annular duct wall described in those patents further comprises a honeycomb layer (or the equivalent).

In order to make each of those parts, the usual technique is to place one or more layers of a preimpregnated fabric or "prepreg" on a male mold (projecting in relief) or in a female mold (recessed) of a shape that matches that of the part, the prepreg generally being constituted essentially by fibers (e.g. carbon fibers) coated with a thermosetting resin; during that "draping" operation, the fibers are oriented along one or more predetermined directions in order to obtain the desired mechanical characteristics for the part.

When the part that is to be made includes a thick core such as a honeycomb, the procedure generally comprises a first draping operation to form a skin (internal or external), followed by depositing the core, and then generally a second draping operation covering the core for the purpose of forming a second skin (respectively external or internal).

The preform as obtained in that way is then made rigid by applying heat, and where appropriate a vacuum, in an autoclave or oven in which a complete mold (male and female) is placed that surrounds the preform; that step serves to polymerize or cross-link the organic matrix.

The operations of making the preform are generally performed manually, thereby leading to losses of composite material, and it does not enable the mechanical characteristics of the parts in a series of parts of identical shape to be made in completely reproducible manner.

In order to mechanize the draping operation, it is known to use a fiber placement technique whereby the preimpregnated fibers are deposited by a machine on the outside surface of a mandrel mounted to rotate about an axis of rotation, as described in particular in patents FR 2 766 407 and U.S. Pat. No. 6,613,258.

Nevertheless, that technique is generally restricted to making parts of convex shape and presenting circular symmetry, which does not apply to a tail structure for a rotary wing aircraft with a ducted tail rotor. In particular, the front zone where the tail and the body of the fairing join together presents shapes that are complex, having multiple curvatures: zones in which curvature is reversed where a concave wall is adjacent to a convex wall, and zones of small radius of curvature.

The manufacture of such a tail structure then requires the various composite material parts to be assembled together, by applying adhesive to portions of these parts that are placed in mutually overlapping positions, by riveting, by adhesive and riveting, and/or by using other bonding means.

Those bonding techniques likewise are not suitable for obtaining a resulting assembled structure presenting mechanical characteristics that are completely reproducible. Those bonding techniques also lead to a harmful increase in the weight of the resulting assembled structure.

OBJECTS AND SUMMARY OF THE INVENTION

An object of the invention is to propose a method of manufacturing a pairing structure for the tail rotor of a rotary wing aircraft, which is improved and/or which remedies, at least in part, the drawbacks of known methods of manufacturing such structures.

An object of the invention is to propose tooling or manufacturing apparatus adapted to implementing the method.

An object of the invention is also to provide a composite tail structure for a rotary wing aircraft that is improved and/or that remedies, at least in part, the drawbacks of known helicopter tail structures.

Thus, in a first aspect, the invention provides a method of manufacturing a rotor fairing structure for a rotary wing aircraft, the structure comprising;

a tubular portion (or duct) presenting two ends and including two collars or flanges extending respectively from each of the two ends; and two curved (skew/non-plane) fairing side walls extending respectively around the two collars or flanges; said two side walls being made of a composite material comprising an organic polymer matrix and reinforcement, in particular a settable resin and inorganic fibers.

According to the invention, the side walls are united by solidifying the matrix; preferably one or two preforms are made of the two fairing side walls, the preform(s) presenting a side wall junction zone, said junction zone including said organic matrix (polymer), and the two walls are united by solidifying—or consolidating—the matrix in the junction zone.

Thus, in a single operation, a shell is obtained comprising the two fairing side walls and suitable for receiving the tubular wall defining the tunnel for passing air, without using adhesive nor adding additional connection means for making the shell.

In a preferred embodiment of the invention, the organic matrix of the preform(s) of the side walls is essentially constituted by a thermosetting resin, and the two side walls are united by (simultaneous) setting of the-side wall preform(s).

In another embodiment of the invention, the organic matrix of the preform(s) is essentially constituted by a thermoplastic resin; under such circumstances, the two respective wall portions to be united are placed facing each other in a position of mutual overlap; after optionally softening these portions by heating, they are pressed against one another and cooled; this uniting of the walls in a junction zone can be performed by a machine for placing fibers that are preimpregnated with thermoplastic resin, with the machine performing local heating (by a jet of hot air) in the deposition zone. Thus, the resin is consolidated as deposition progresses When the preform is complete, it is already consolidated (by natural cooling of the resin), thereby avoiding the baking step.

The preform(s) is/are preferably prepared from fibers—or a fiber fabric—, in particular carbon fibers impregnated with said resin.

Preferably, and in addition, the preimpregnated fibers—and/or fabric—is/are deposited and oriented mechanically on a projecting or recessed mold and/is are heated and pressed against the external (or internal as the case may be) face of the mold; in a variant, or in addition, a preimpregnated fabric can be deposited and oriented manually on the mold.

Also preferably, in addition to the preform(s) of the fairing side walls, one (or two) composite preform(s) for the wall of the rudder (or fin), and/or one (or two) composite preform(s) for the wall for connection to a tail boom are also simultaneously united together with the side wall preform(s) from which it/they extend.

In an implementation of the invention, a single preform of composite material is made by placing preimpregnated fibers around a segmented core or mandrel in order to form said two fairing side walls, preferably together with two rudder side walls and/or a substantially cylindrical or frustoconical wall for connection with the tail boom of the aircraft.

Thereafter, the mandrel segments forming the segmented mandrel are separated and the segments are extracted from the cavity defined by the fairing side wall preform in particular, via an opening provided in one of said side walls; thereafter the preform is transferred into a two-part recessed mold; an expandable and/or retractable structure for supporting the preform—such as an inflatable bladder—is preferably inserted in said cavity, and the preform is solidified in an autoclave. After the resin has polymerized, the tail structure is extracted from the recessed mold and the support structure is deflated and extracted from said cavity; thereafter the duct defining the air tunnel is united with the resulting tail structure.

In a variant implementation of the invention, a single thermosetting preform is prepared on a mandrel that can withstand heating, and the preform wrapped in a vacuum bag is baked in an autoclave, thereby making it unnecessary to use two baking half-molds.

To improve the surface state after baking, it is possible to interpose between the preform and the vacuum bag a material that is smooth and relatively rigid (a preformed silicone plate, polymerized glass plies) so as to avoid folds in the vacuum bag leaving marks on the preform and so as to obtain an outside surface for the preform that is smooth in appearance.

Furthermore, by using an expandable material for the mandrel, the pressurization for the purpose of compacting the preform can be performed in part at least by expanding the mandrel; for this purpose, it is preferable to use a metal material presenting a linear coefficient of expansion of the order of $10^{-5}$ meters per degree C. (m/° C.) or a coefficient of expansion that is greater than that; in particular, the mandrel is made out of a steel or aluminum alloy presenting this characteristic.

In another implementation of the invention, two side preforms are made that are substantially symmetrical about a plane; each composite material (and/or sandwich) preform has a first portion for forming a (right or left) side wall of the fairing, and preferably a second portion for forming a (right or left) side wall of the rudder, and/or a third portion for forming the wall for connection with a tail boom.

Each of these portions presents at least one (substantially plane) peripheral junction strip suitable for being folded/bent so as to cover a peripheral junction strip of a corresponding portion of a substantially symmetrical preform.

Each of these preforms is preferably obtained by mechanically placing fibers that are preimpregnated with resin under pressure on a (left or right) half-mold that projects or is recessed.

The two (substantially symmetrical) preforms can be placed respectively in two recessed half-molds of appropriate shape, which are then pressed one against the other; the respective peripheral junction strips of the two preforms are put mutually into intimate contact in order to obtain good structural continuity of the finished part in this junction zone corresponding substantially to the join plane of the half-molds.

The two recessed half-molds containing the two preforms as arranged in this way are then placed in an autoclave in order to cause the structure to set.

After the finished part has been extracted from the mold, the annular wall forming the duct is united with the fairing part as obtained in this way by adhesive or by rivets.

When using a thermoplastic resin, two thermoplastic preforms can be prepared on two mandrels and then the preforms can be united via the junction zone by local heating.

This method makes it possible to avoid having recourse to two baking half-molds and passing through an autoclave. It requires tooling for holding the preforms so as to position the two preforms side by side in three dimensions, and tooling of the form and contra-form type for pressing the margins against each other during local heating, where the local heating can be performed by said tooling.

BRIEF DESCRIPTION OF THE DRAWINGS

Other characteristics and advantages of the invention appear from the following description which refers to the accompanying drawings showing preferred implementations of the invention without any limiting character.

FIGS. 2 to 5 show successive steps in a method of manufacturing the tail part shown in FIG. 6 by using the tooling shown in FIG. 1:

FIG. 2 is a diagrammatic perspective view showing the FIG. 1 tooling comprising a mandrel and fitted with a shaft enabling the mandrel to pivot about the longitudinal axis of the shaft;

FIG. 3 is a diagrammatic perspective view showing a prepreg-draped mandrel being put into place in a recessed half-mold;

FIG. 4 is a diagram showing the mandrel being extracted from the cavity defined by the preform placed in a recessed mold; and FIG. 5 is a diagram showing the solidified tail part being extracted from the two-part recessed mold.

FIG. 6 is a perspective view of a helicopter tail part of the invention.

FIGS. 9 to 11 relate to a second implementation of the invention.

FIG. 9 is a diagrammatic perspective view showing tooling for assembling two preforms of the kind shown in FIG. 11.

FIG. 10 is a diagrammatic perspective view showing a preform designed to form the left side of a tail structure of the invention.

FIG. 11 is a view from substantially the same direction of observation as FIG. 10, showing two substantially symmetrical preforms placed facing each other.

FIG. 12 is a diagrammatic cross-section view showing tooling for making a thermoplastic shell by simultaneous consolidation of overlapping portions of two preforms.

FIG. 13 is a diagrammatic cross-section view of tooling for making a tail structure from a preform supported by a mandrel, by using suction to press down a flexible envelope containing the preform.

MORE DETAILED DESCRIPTION

Figure 1:
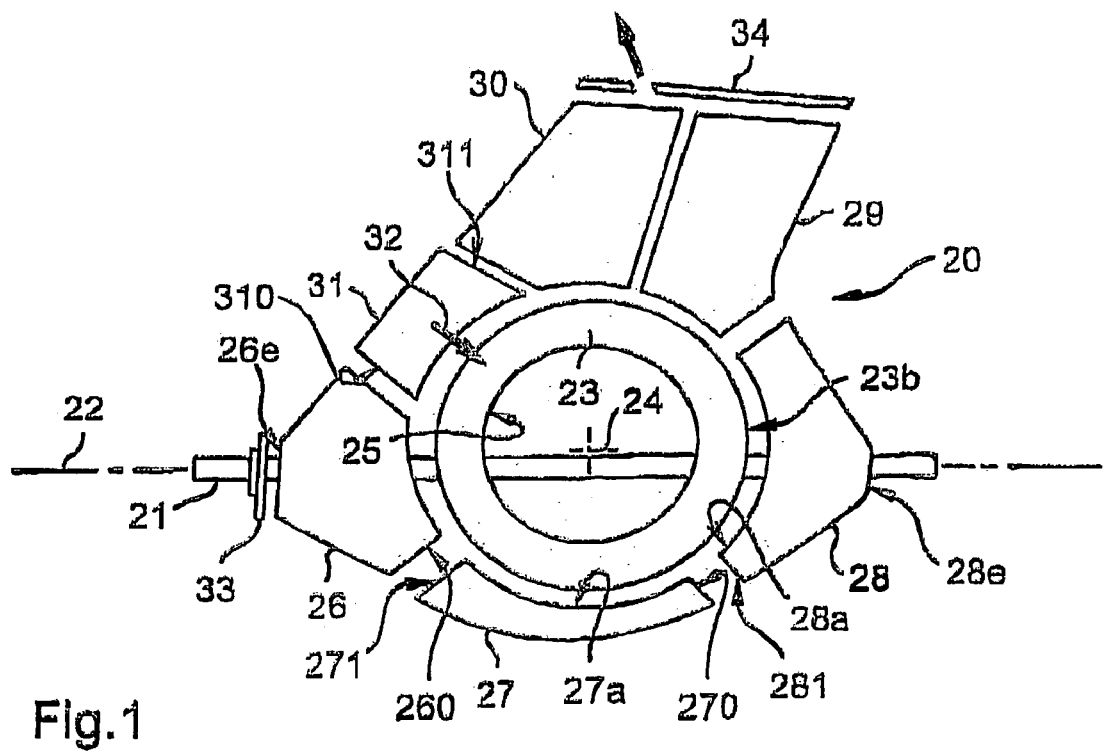
FIG. 1 is a diagrammatic side view of tooling comprising a segmented mandrel used for manufacturing a helicopter tail part of the kind shown in FIG. 6, by a method of manufacture constituting a first implementation of the invention.

Unless specified to the contrary, in the present application, the terms "left" and "right" are used relative to an observer looking at the helicopter and/or helicopter tail structure from behind; the terms "front" and "rear" are used with reference to the normal forward travel direction of the helicopter.

With reference to FIGS. 1 to 4 in particular, the apparatus for molding a composite fairing structure comprises a core or mandrel 20 suitable for being reversibly united with a shaft 21 presenting a longitudinal axis 22.

The mandrel comprises an annular central part 23 that is substantially circularly symmetrical about an axis 24; the part 23 having two orifices 25 in alignment, through which there extends the shaft 21.

With reference to FIG. 1, the mandrel further comprises six mandrel sectors or segments 26 to 31 that are disposed around the part 23 which they encircle.

For other implementations, the number of parts constituting the mandrel, and the shape and arrangement of said parts can vary as a function of geometrical, mechanical, and thermal constraints specific to each implementation.

Each of these sectors, and in particular the sector 27 or 28, presents an inner concave bearing face, in particular the faces 27a of the sector 27 and 28a of the sector 28, suitable for being placed in intimate contact with and/or to fit snugly against a corresponding portion of the outer convex surface 23b of the part 23.

When the outer surface 23b of the part 23 is cylindrical in shape about the axis 24 and presents a radius that is constant relative to said axis, the inner faces such as 27a, 28a of the sectors 26 to 31 are in the form of portions of a cylinder, having the same radius, with these inner faces together covering substantially all of the surface 23b; this corresponds to a configuration in which the sectors (26 to 31) are assembled around a central ring 23; the configuration shown in FIG. 1 is different insofar as the sectors are shown spaced apart from the part 23 in order to improve understanding of the structure of the mandrel.

Figure 2:
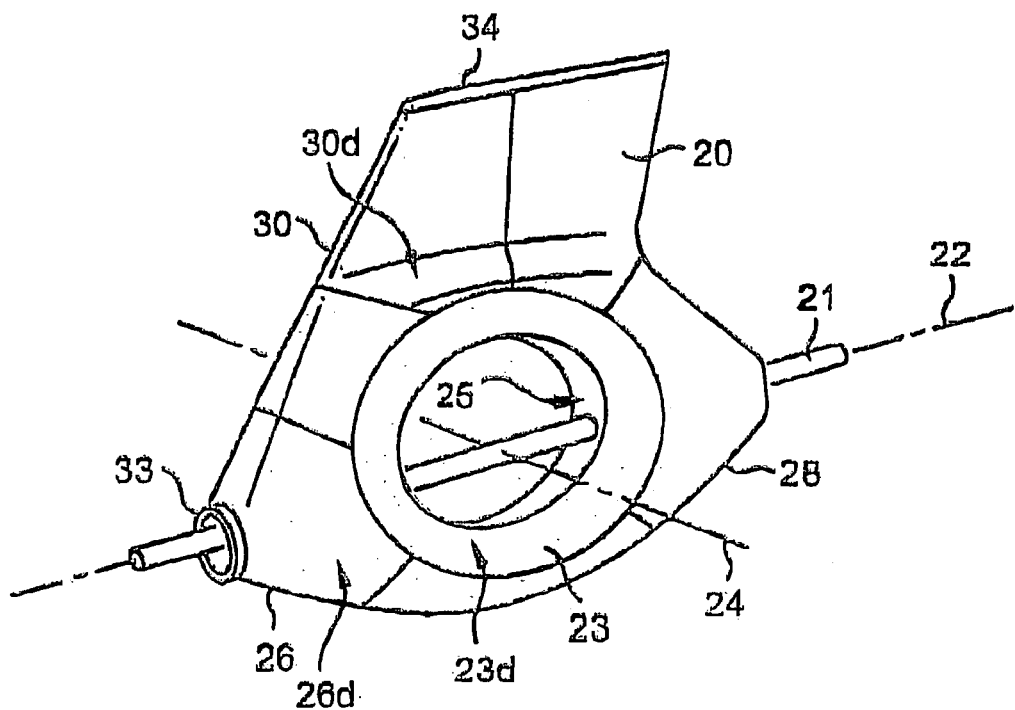

The configuration shown in FIG. 1 is converted into an assembled mandrel configuration suitable for receiving strips of prepreg deposited thereon, as shown in FIG. 2, by moving the sectors towards the part 23 in substantially radial translation towards the axis 24, along arrow 32 for the sector 31.

In this assembly position (FIG. 2), the sectors are united with the ring 23 by conventional bonding means (not shown); in this configuration, two adjacent sectors are substantially in contact via respective end faces such as faces 260 and 271 for the sectors 26 and 27, or the faces 270 and 281 for the sectors 27 and 28; in addition, the (outer) side faces such as the face 26d of the sector 26 and the face 30d of the sector 30, of two adjacent sectors are tangential along their mutually facing edges, and tangential to the side surface 23d of the ring 23 so as to form a smooth side surface for receiving the prepreg, in the configuration shown in FIG. 2 when the mandrel sectors have been put into contact with the ring 23 and united therewith.

With reference to FIGS. 1 and 2, the shaft 21 enabling the mandrel 20 to rotate about the axis 22 extends through two of the sectors 26 and 28 of the mandrel, passing through a front face 26e of the sector 26 and a rear face 28e of the sector 28.

The tooling also comprises a disk-shaped part 33 and a part 34 in the form of a tapering blade; the part 33 has an opening through which the shaft 21 passes; the part 33 is secured to the front face 26e of the sector 26 with which it forms a male mold portion for a portion of the prepreg preform that constitutes a portion for connecting the composite tail structure to the rear portion (or tail boom) of the fuselage of a helicopter.

The part 34 is united with the top ends of the sectors 29 and 30 so as to form a male mold portion for a portion of the preform that is to form a fin portion in the final composite structure.

After the sectors 26 to 31, the ring 23, the shaft 21, and the parts 33 and 34 have been assembled together to form the mandrel or male mold, the mandrel is mounted to rotate (or to oscillate) on the frame of a machine for automatically placing prepreg, which then places one or more layers of resin-impregnated fibers or fabric on the outside surface of the mandrel, which machine applies pressure (using a presser wheel or roller) against the fibers or fabric being deposited, and cuts said fibers or fabric to the desired length; these operations are performed under the control of a controller of the machine as a function of a specific program and data relating to the shape of the part that is to be obtained, and as a function of the number and the orientation of the various segments of prepreg fibers or strips used for making the preform.

As mentioned in the introduction, at least a portion of the preform corresponding to the side walls of the structure that is to be obtained includes a core of honeycomb material which is shaped and pressed between two skins of prepreg.

Figure 3:
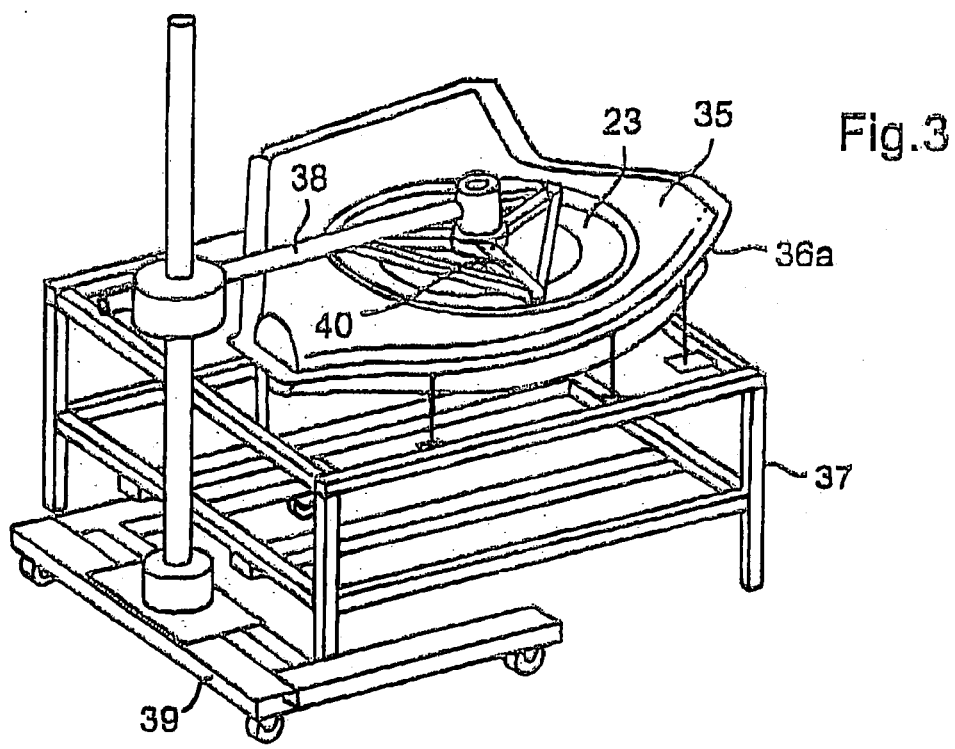

Once the preform has been obtained in this way, the shaft 21 is separated from the mandrel, and the mandrel carrying the preform 35 is placed in a recessed half-mold 36a of shape matching the shape of the outer half-face of the part that is to be obtained; for this purpose, and as shown in FIG. 3, the half-mold 36a is placed on a support 37, while the mandrel is supported by an arm 38 of a manipulator 39, the arm 38 being temporarily secured to the ring 23 of the mandrel via a triangle structure 40.

Figure 4:
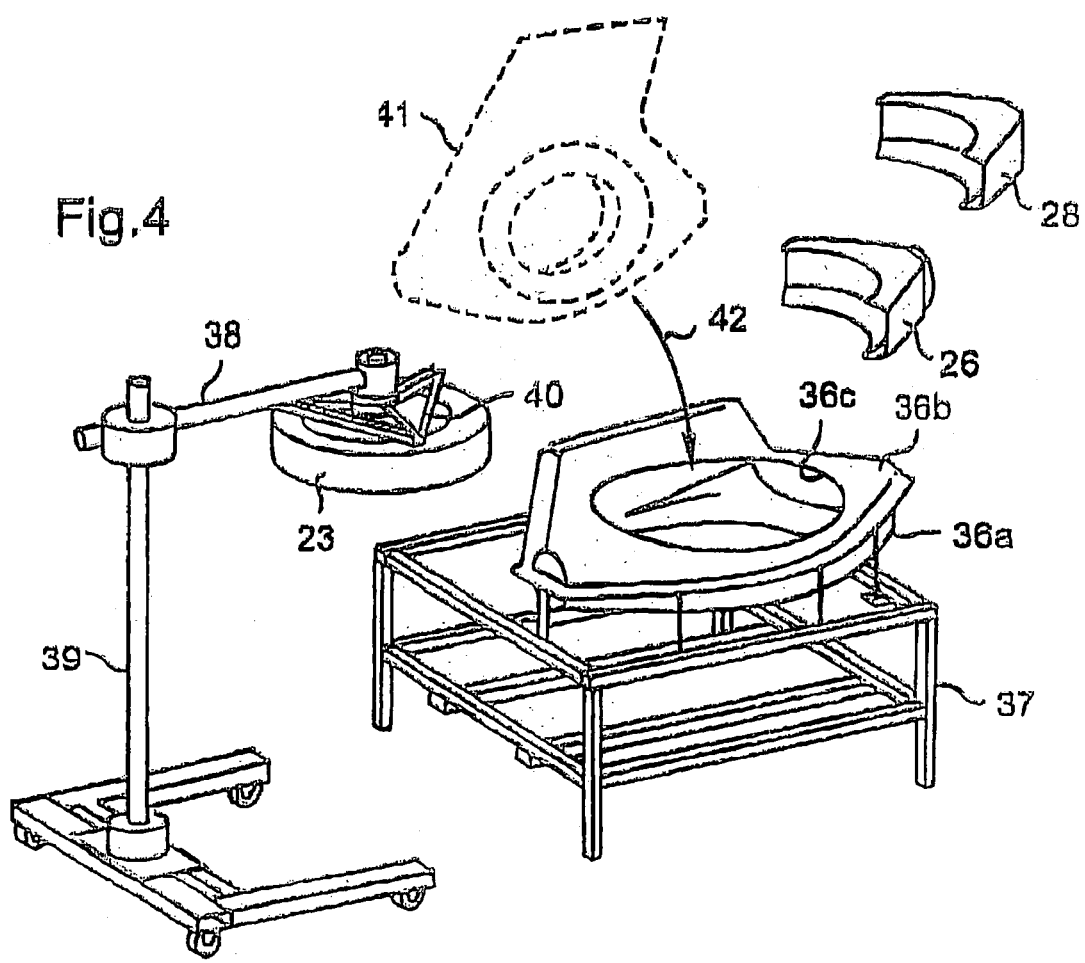

With reference to FIG. 4, a second half-mold 36b having a side opening 36c is then united with the half-mold 36a and together therewith it covers the preform; the mandrel is then extracted from the preform through a side opening provided in a side face of the preform and through the opening 36c provided in the wall of the half-mold 36b, extending substantially in register with the side opening in the preform; for this purpose, the ring 23 is separated from the segments and extracted from the mold 36a, 36b, being held suspended from the arm 38 of the manipulator 39.

A first segment, such as the segment 31 shown in FIG. 1, is then moved along arrow 32 towards the axis 24 so as to come into register with said openings and be extracted from the mold therethrough; thereafter the other segments 26 to 30 are extracted in succession, preferably beginning with one of the segments (26 or 30) adjacent to the previously-extracted segment 31, and so on.

For this purpose, the end faces of segments other than the segment 31, such as the faces 270 and 271 for the segment 27, extend substantially radially relative to the axis 24 corresponding substantially to the axis passing through the centers of said openings; in contrast, the end faces 310 and 311 of the segment 31 extend substantially parallel to each other and parallel to the arrow 32 extending toward the axis 24.

After the cores have been extracted from the cavity defined by the preform and by the walls of the mold 36a, 36b supporting the preform, a deformable wall 41 or bladder for supporting the preform is then inserted (along arrow 42 in FIG. 4) into the cavity, and is placed in contact with the inside face of the preform so as to support it during the subsequent operations of the method.

To this end, the bladder can be inflated with a gas under pressure, such as air; alternatively, suction can be established in the mold 36a, 36b in order to press the walls of the skin or bladder 41 against the inside face of the hollow preform housed in the mold.

The mold containing the preform, and the preform support structure are then placed in an autoclave or oven in order to harden the resin of the prepreg of the preform.

At the end of this operation, the two half-molds 36a and 36b are separated from each other and the part of the invention is extracted from the mold, as shown in FIG. 5.

With reference to FIG. 6, the helicopter tail structure 43 as obtained in this way is approximately symmetrical about a fore-and-aft plane 56; the structure comprises a first side wall 45 having a circular opening 46 centered on a transverse axis 57 that is substantially orthogonal to the plane 56; the structure 43 has a second side wall 47 having a circular opening 48 whose center is likewise situated on the axis 57.

The wall 45 is extended upwards by a wall 52 forming a fin left wall 51, while the wall 47 is extended upwards by a wall 53 forming a fin right wall.

The front portions of the walls 52 and 53 meet along a front zone 60, and the front portions of the walls 45 and 47 meet to form a front zone 55a, 55b having a top portion 55a that extends the zone 60.

Between the curved front portions 55a and 55b there extends a portion 44a, 44b for connecting the tail structure to the helicopter fuselage; this portion comprises a short cylindrical portion 44a extending along an axis 58 contained in the plane 56, and a plane portion 44b in the form of a disk on the axis 58, and surrounded by the portion 44a.

The bottom portions of the walls 45 and 47 meet to form a bottom zone 49 having an opening 50, while the rear portions of the walls 45 and 47 form a rear junction zone 62 which has an opening 59.

In FIG. 6, it can also be seen that the top portions of the walls 52 and 53 meet via a plane portion 54, while the rear portions of these walls 52 and 53 meet along a zone 61.

The junction zones 49, 54, 55a, and 55b, and 60 to 62 co-operate with the side walls 45, 47, 52, and 53 and with the connection structure 44a, 44b to form a hollow structure that is rigid, one-piece, and lightweight.

Figure 7:
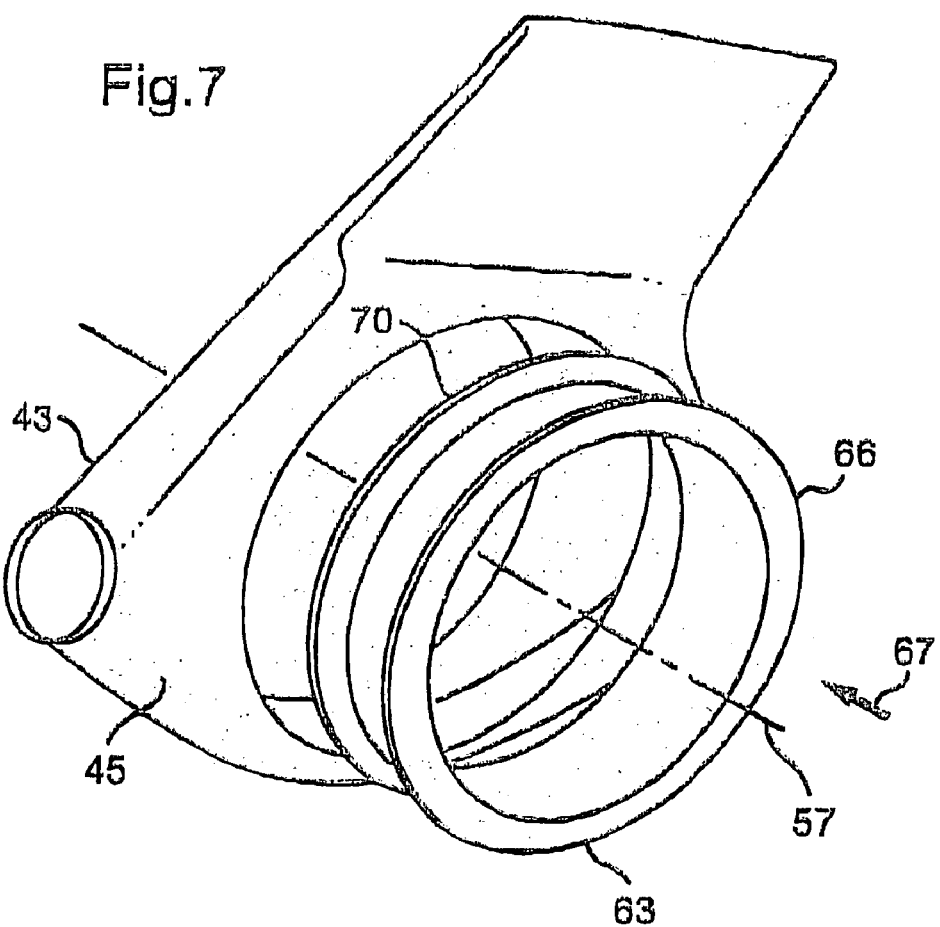
FIG. 7 is a diagrammatic perspective view showing a tunnel duct being put into place in a helicopter tail part of the invention, for the purpose of uniting these two parts.
Figure 8:
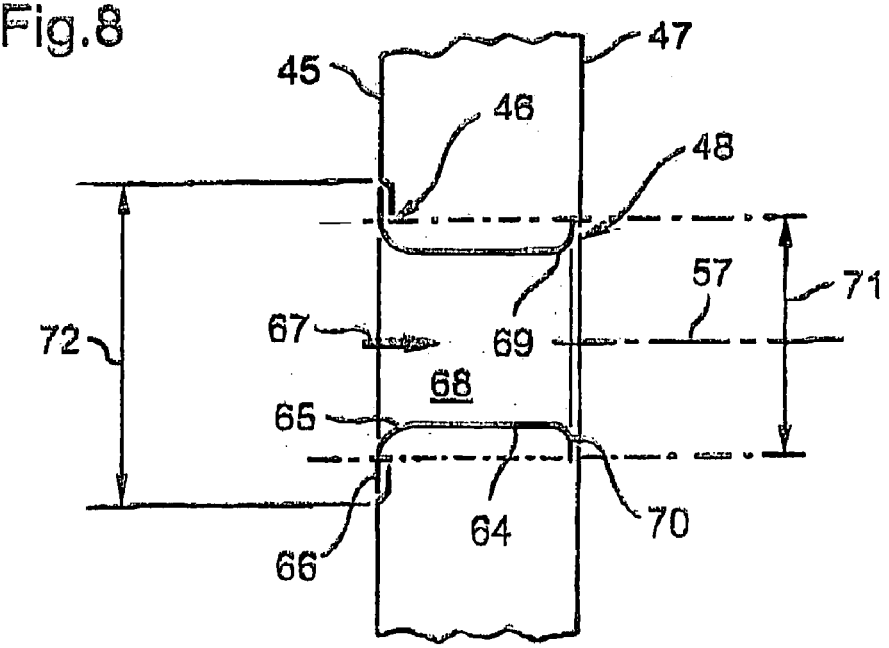
FIG. 8 is a fragmentary section view on a section plane containing the axis of the air tunnel duct showing the duct being assembled with the two opposite side walls of a tail part of the invention.

This structure 43 is subsequently assembled with a duct 63, as shown in FIGS. 7 and 8 to form a helicopter tail-rotor fairing.

The duct 63 is likewise made of a composite material and comprises a substantially cylindrical central portion 64 (of substantially constant radius) about the axis 57.

As represented by arrow 67 (FIG. 8), upstream from this central portion relative to the travel direction of the flow of air driven by the rotor (not shown) placed in the tunnel 68 defined by the duct 63, and corresponding to the direction opposite to the aerodynamic thrust delivered by the anti-torque rotor, there is provided a converging portion 65 having a first circular flange 66 extending from the end thereof.

At the opposite end of the duct 63, there is provided a diverging portion 69 terminated by a second circular flange 70 parallel to the first flange 66, and of outside diameter 71 smaller than the outside diameter 72 of the flange 66.

As shown in FIG. 8 in particular, the downstream portion of the duct 63 is inserted inside the structure 43 by passing through the opening 46 formed in the side wall 45 along arrow 67 until the small-diameter flange 70 comes into contact with the inside face of the wall 47 around the opening 48 provided in this wall.

In this configuration, the larger-diameter flange 66 is in contact with the outside face of the wall 45 around the opening 46 provided therein; in this position, the parts 63 and 43 are assembled together by adhesive (and where appropriate by rivets) uniting those portions of the flanges of the duct 63 that overlap corresponding portions of the side walls of the part 43.

Figure 9:
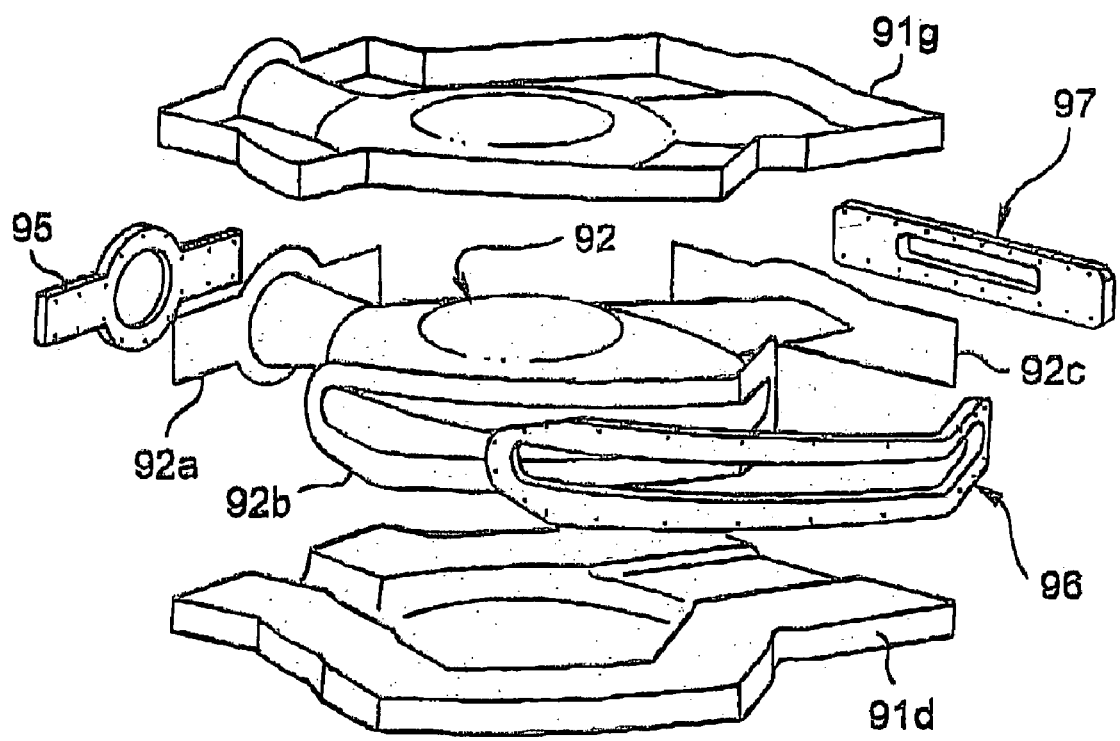
Figure 10:
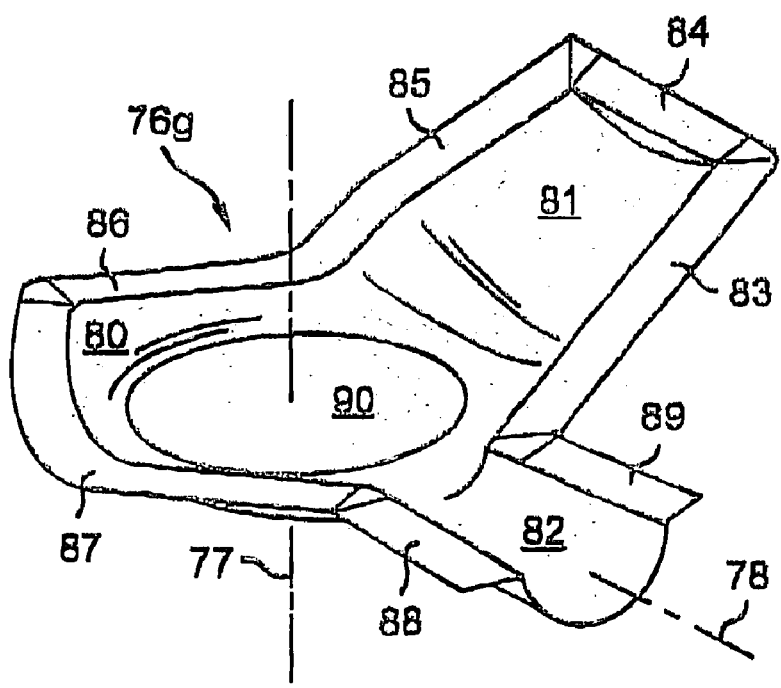

In the preferred implementation corresponding to FIGS. 9 to 11, an overall preform is made from two substantially symmetrical preforms 76g and 76d, as shown in FIG. 11.

The left preform 76g shown in FIG. 10 comprises a substantially circular central portion 90 extending perpendicularly to an axis 77 passing through its center; a side preform portion 80 extends around the central portion 90; a portion 82 for connection with the fuselage extends from the portion 80; the portion 82 is substantially in the form of a tapering half-tube of axis 78 parallel to the plane of the portion 90; a portion 81 of the preform forming the left wall of the fin likewise extends from the portion 80.

Each of the portions 80, 81, and 82 of the prepreg preform is extended at its periphery by a strip of prepreg, these strips being respectively referenced 83 to 89.

These strips serve to form a peripheral junction portion between the two (half)-preforms forming the tail structure.

As shown in FIGS. 9 and 11, when a left preform 76g is placed facing a right preform 76d in the mold of FIG. 9 comprising two recessed half-molds 91g and 91d of suitable shape, their respective junction strips, such as the strip 83d forming a front margin of the preform 76d and the strip 83g forming a front margin of the preform 76g, are placed facing each other; since the two preforms are pressed against a central core 92 (FIG. 9), their respective peripheral strips (or margins) are folded down one against the other in pairs and they are pressed against each other so as to form a peripheral junction zone extending substantially around the preform.

The tooling shown in FIG. 9 further comprises three flat parts 95 to 97; these parts are used to seal the respective end faces 92a, 92b, and 92c of the flexible core 92 supporting the preform in the mold, together with the corresponding peripheral walls of the mold 91d, 91g; they also make it possible to provide a mechanical connection between the two half-molds.

After closing the mold shown in FIG. 9, hardening the resin, and then opening the mold, the resulting part is similar to that shown in FIG. 6; in this figure, it can be seen that the part 43 is of complex shape, being flattened along the axis 57 and elongate in a direction of the plane 56 that is near to the respective directions of the leading and trailing edges of the fin-forming portion; this part presents concave connection portions respectively for the side portions 45, 47 with the side portions 52 and 53; the side fairing portions 45, 47 are hollowed out to a great extent.

With reference to FIG. 12, a first thermoplastic half-preform 100 is supported by a support tool 101, and a second thermoplastic half-preform 102 is supported by another preform holding tool 103.

A peripheral portion (or edge) 102a of the preform 102 overlaps a peripheral portion 100a of the preform 100; symmetrically, an edge 100b of the preform 100 overlaps an edge 102b of the preform 102.

A male forming tool 110 extends between the preforms 100 and 102, having a portion 111 placed facing the edges 100b and 102b for uniting, and being of a shape that matches the inside face of the part that is to be made in the junction zone between the edges 100b, 102b.

A female forming tool 112 extends on the outside of the preform; a portion 113 of the tool 112 is placed facing the superposed edges 100b, 102b and matches the shape in this junction zone of the outside face of the part that is to be made.

The edges 100b, 102b are united by moving the tool 112 along arrow 114 towards the tool 110, so as to compress the edges between the faces 111 and 113 of the tools 110, 112.

This operation may require the edges to be softened by heating; it enables the edges to be united by melting the resin and then cooling the resin.

With reference to FIG. 13, the preform 100 is supported by a two-part mandrel 104, 105, with the preform matching the shape of the outside surface 106 of the mandrel.

Means for establishing suction in the interstitial space 107 between the mandrel and the preform and/or in the-interstitial space 108 between the preform and the envelope 109 enable the shapers and the envelope portions to be pressed against the outside surface of the preform.

An air-tight bag or cover 109 surrounds the preform 100 and the antiwrinkle shapers 120, 121 interposed between the preform and the envelope; the inside faces 123, 124 of the shapers 120, 121 match the shapes of the corresponding portions of the outside race of the part obtained by making the preform 100 rigid.

Naturally, various additions, omissions, or modifications can be implemented by the person skilled in the art on the various implementations described above, both concerning structural elements and functional components, without thereby going beyond the ambit of the present invention.

What is claimed is:

1. A method of manufacturing a tail structure for a rotary wing aircraft, the structure comprising:
   a tubular portion or duct having two ends and including two collars or flanges extending respectively from each of said two ends; and
   two curved fairing side walls extending respectively around the two collars or flanges;
   the two side walls are made of a composite material comprising an organic matrix and reinforcement,
   said method comprising the steps of:
   uniting the curved-fairing side walls by solidifying the matrix to form a one-piece shell configured for receiving the tubular portion upon solidification, and
   connecting the shell to the tubular portion using the collars or flanges wherein one or two fairing side wall preforms are made, each preform having a side wall junction zone, the junction zone comprising said organic polymer matrix, and the two curved fairing side walls are united by solidifying or consolidating the matrix in the junction zone.

2. The method according to claim 1, wherein said reinforcement is resin-preimpregnated reinforcement used to make at least one side wall preform.

3. The method according to claim 2, in which the resin-preimpregnated reinforcement is put into place on a mold with pressure being applied.

4. The method according to claim 3, in which the reinforcement is put into place mechanically.

5. The method according to claim 3, in which the reinforcement is put into place manually.

6. The method according to claim 1, in which the organic matrix of the side wall preform(s) is constituted by a thermosetting resin.

7. The method according to claim 1, in which the organic matrix of the side wall preform(s) is constituted by a thermoplastic resin.

8. The method according to claim 1, in which the preform (s) is/are prepared from fibers or a fiber fabric which is/are impregnated with a resin, and in which the preimpregnated fibers and/or fabric is/are deposited and oriented mechanically or manually on a projecting or recessed mold, and is/are pressed against an outside or an inside face, as appropriate, of the mold.

9. The method according to claim 1, in which the two side walls are hardened together and are united via at least one peripheral junction portion.

10. The method according to claim 1, in which, in addition to the fairing side wall preform(s), one or two composite wall preform(s) for a rudder or a fin is/are simultaneously united with the side wall preform(s) from which it/they extend.

11. The method according to claim 1, in which, in addition to the fairing side wall preform(s), one or two composite wall preform(s) for connection to a tail boom is/are simultaneously united with the side wall preform(s) from which it/they extend.

12. The method according to claim 1, in which one preform of composite material is made by placing preimpregnated fibers around a segmented core or mandrel to form both of said fairing side walls.

13. The method according to claim 12, wherein a plurality of mandrel segments forming the segmented core or mandrel are separated, said segments being extracted from a cavity defined by the preform of the fairing side walls, via an opening provided in the side walls.

14. The method according to claim 13, in which the preform is then transferred into a two-part recessed mold.

15. The method according to claim 13, in which an expandable and/or shrinkable preform support structure is then inserted into said cavity, and the preform is solidified.

16. The method according to claim 15, in which the preform is solidified in an autoclave.

17. The method according to claim 1, in which two side preforms are made, each preform being made of composite material comprising a first portion for forming a fairing side wall, a second portion for forming a rudder side wall, and a third portion for forming a wall for connection with a tail boom.

18. The method according to claim 17, in which each of the portions has at least one peripheral junction strip suitable for being folded and/or bent to overlie a peripheral junction strip of a corresponding portion of an opposing one of said preforms.

19. The method according to claim 17, in which each of the preforms is obtained by placing resin-preimpregnated fibers under pressure on a projecting or recessed half-mold.

20. The method according to claim 19, in which the fibers are placed mechanically.

21. The method according to claim 19, in which both preforms are placed in respective recessed half-molds of appropriate shape, the respective peripheral junction strips of the two preforms then being put into mutual intimate contact in order to obtain good structural continuity of a finished part in said junction zone corresponding to a join plane of the half-molds, the half-molds together then being closed, and placed in an autoclave to cause the preforms of the finished part to set.

* * * * *